US00RE49971E

(19) United States
(12) Reissued Patent
Hu

(10) Patent Number: US RE49,971 E
(45) Date of Reissued Patent: May 21, 2024

(54) INFLATABLE CUSHION

(71) Applicant: Pan Hu, Dongguan (CN)

(72) Inventor: Pan Hu, Dongguan (CN)

(21) Appl. No.: 29/843,167

(22) Filed: Jun. 17, 2022

Related U.S. Patent Documents

Reissue of:
(64) Patent No.: Des. 942,186
Issued: Feb. 1, 2022
Appl. No.: 29/767,767
Filed: Jan. 25, 2021

(51) LOC (14) Cl. ..... 06-09
(52) U.S. Cl.
USPC ..... D6/604
(58) Field of Classification Search
USPC ..... D6/582–583, 587–592, 595–609, D6/617–622; D21/803–809; D24/183
(Continued)

(56) References Cited

U.S. PATENT DOCUMENTS

D108,622 S * 3/1938 Johnson ..... D6/604
D262,590 S * 1/1982 Trotman ..... D6/596
(Continued)

FOREIGN PATENT DOCUMENTS

CN 304916677 * 11/2018
CN 305112750 * 4/2019
(Continued)

OTHER PUBLICATIONS

Google search: "Inflatable Cushion" [site visited Oct. 18, 2021]: https://www.google.com/search?q=INFLATABLE+CUSHION&sxsrf=AOaemvKTNfmL7GHgVB9KBEUGJIL2dzMurA:1634933730424&source=1nms&tbm=isch&sa=X&ved=2ahUKEwjSoO7h6t7zAhUQc98KHUbgDaUQ_AUoAnoECAEQBA&biw=1200&bih=1777&dpr=1 (Year: 2021).*
(Continued)

*Primary Examiner* — Darlington Ly
(74) *Attorney, Agent, or Firm* — ScienBiziP, P.C.

(57) CLAIM

The ornamental design for an inflatable cushion, as shown and described.

DESCRIPTION

FIG. 1 is a front, right and [top] *bottom* perspective view of an inflatable cushion, showing my design[.];
FIG. 2 is a rear, left and [bottom] *top* perspective view thereof[.]*;*
FIG. 3 is a front elevation view thereof[.]*;*
FIG. 4 is a rear elevation view thereof[.]*;*
FIG. 5 is a [bottom plan] *left side elevation* view thereof[.]*;*
FIG. 6 is a [top plan] *right side elevation* view thereof[.]*;*
FIG. 7 is a [left side elevation] *top plan* view thereof[.]*; and*
FIG. 8 is a [right side elevation] *bottom plan* view thereof.
The broken lines shown in the drawings are included for the purpose of illustrating portions of the inflatable cushion that form no part of the claimed design.

1 Claim, 8 Drawing Sheets

Matter enclosed in heavy brackets [ ] appears in the original patent but forms no part of this reissue; matter printed in italics indicates the additions made by reissue.

(AMENDED)

(58) Field of Classification Search
CPC ..... A47G 9/00; A47G 2009/001; A47G 2009/002; A47G 2009/003; A47G 2009/005; A47G 2009/006; A47G 9/02; A47G 9/0207; A47G 9/0215; A47G 9/0223; A47G 9/023; A47G 9/0238; A47G 9/0246; A47G 9/0253; A47G 9/0261; A47G 9/06; A47G 9/062; A47G 9/066; A47G 9/068; A47G 9/08; A47G 2009/0276; A47G 9/0284; A47G 9/0292; A47G 9/04; A47G 9/10
See application file for complete search history.

(56) References Cited

U.S. PATENT DOCUMENTS

| | | | | | |
|---|---|---|---|---|---|
| D314,804 | S | * | 2/1991 | Thomas | D6/596 |
| D314,805 | S | * | 2/1991 | Thomas | D6/596 |
| D315,187 | S | * | 3/1991 | Thomas | D6/596 |
| D315,188 | S | * | 3/1991 | Thomas | D6/596 |
| D315,189 | S | * | 3/1991 | Thomas | D6/596 |
| D315,388 | S | * | 3/1991 | Thomas | D6/596 |
| D315,774 | S | * | 3/1991 | Thomas | D6/596 |
| D341,983 | S | * | 12/1993 | Wang | D6/604 |
| 5,437,068 | A | * | 8/1995 | Fisher | A47C 27/081 5/656 |
| D365,485 | S | * | 12/1995 | Rossman | D6/596 |
| D391,435 | S | * | 3/1998 | Song | D6/601 |
| D397,443 | S | * | 8/1998 | Fletcher | D24/183 |
| D403,773 | S | * | 1/1999 | Fletcher | D24/183 |
| D407,671 | S | * | 4/1999 | Muhanna | D12/128 |
| D407,785 | S | * | 4/1999 | Scheurer | D21/803 |
| D414,976 | S | * | 10/1999 | Su | D6/596 |
| D419,495 | S | * | 1/2000 | Muhanna | 5/733 |
| D438,417 | S | * | 3/2001 | Liu | D6/601 |
| D446,674 | S | * | 8/2001 | Chapman | D6/601 |
| D484,560 | S | * | 12/2003 | Lin | D21/809 |
| D539,717 | S | * | 4/2007 | Hussaini | D6/582 |
| D560,947 | S | * | 2/2008 | Kreucher | D6/601 |
| D584,911 | S | * | 1/2009 | Hisey | D6/601 |
| 8,281,436 | B2 | * | 10/2012 | Spahn | A61G 7/05784 5/81.1 HS |
| D843,755 | S | | 3/2019 | Berry, Jr. | D6/604 |
| D849,445 | S | * | 5/2019 | Li | D6/596 |
| D857,829 | S | * | 8/2019 | Peterson | A47C 27/081 D21/809 |
| D859,887 | S | | 9/2019 | Bennett | D6/601 |
| D878,805 | S | * | 3/2020 | Burriss | D6/596 |
| D879,507 | S | * | 3/2020 | Burriss | D6/596 |
| D880,904 | S | * | 4/2020 | Hua | D6/604 |
| D885,086 | S | * | 5/2020 | Zhang | D6/604 |
| D894,637 | S | * | 9/2020 | Jiang | D6/604 |
| D897,728 | S | * | 10/2020 | Burriss | D6/596 |
| D897,740 | S | * | 10/2020 | Tan | D6/604 |
| D898,462 | S | * | 10/2020 | Tan | D6/604 |
| D899,149 | S | * | 10/2020 | Tan | D6/604 |
| D899,150 | S | * | 10/2020 | Cheng | D6/605 |
| D905,475 | S | * | 12/2020 | Zhang | D6/604 |
| D911,074 | S | * | 2/2021 | He | D6/604 |
| D921,400 | S | * | 6/2021 | He | D6/604 |
| D923,973 | S | * | 7/2021 | Yuan | D6/604 |
| D931,014 | S | * | 9/2021 | Shi | D6/604 |
| D942,186 | S | * | 2/2022 | Hu | D6/604 |
| 2016/0166077 | A1 | * | 6/2016 | Liu | A47C 27/10 5/710 |
| 2017/0354269 | A1 | * | 12/2017 | Burriss | A47C 7/425 |

FOREIGN PATENT DOCUMENTS

| | | | |
|---|---|---|---|
| CN | 305469398 | * | 12/2019 |
| CN | 305557705 | * | 1/2020 |
| CN | 305786100 | * | 5/2020 |
| CN | 306437714 | * | 4/2021 |
| CN | 305978071 | * | 8/2021 |
| JP | D1695572 | * | 9/2021 |

OTHER PUBLICATIONS

Google search: "inflatable sleeping pad" [site visited Oct. 18, 2021]: https://www.google.com/search?q=inflatable+sleeping+pad&sxsrf=AOaemv10-xRVKM9YkA16tR-_2aXJeGC6xw:1634934835645&source=lnms&tbm=isch&sa=X&ved=2ahUKEwihwO_w7t7zAhUiheAKHWKUDL4Q_AUoAnoECAEQBA&biw=1200&bih=1777&dpr=1 (Year: 2021).*

MEETPEAK Camping Sleeping Pad, early review date Apr. 13, 2021, [online], [site visited Oct. 22, 2021]. Available from Internet, <URL: https://www.amazon.eom/MEETPEAK-Inflatable-Ultrallight-Waterproof-Backpacking/dp/B08SJXXQ84 th=1 (Year: 2021).*

Amazon search: "inflatable sleeping pad" [site visited Oct, 18, 2021]: https://www.amazon.com/s?k-inflatable+sleeping+pad&qid-1634936606&sprefix=inflatable+sle%2Caps%2C69&ref=sr_pg_1 (Year: 2021).*

* cited by examiner

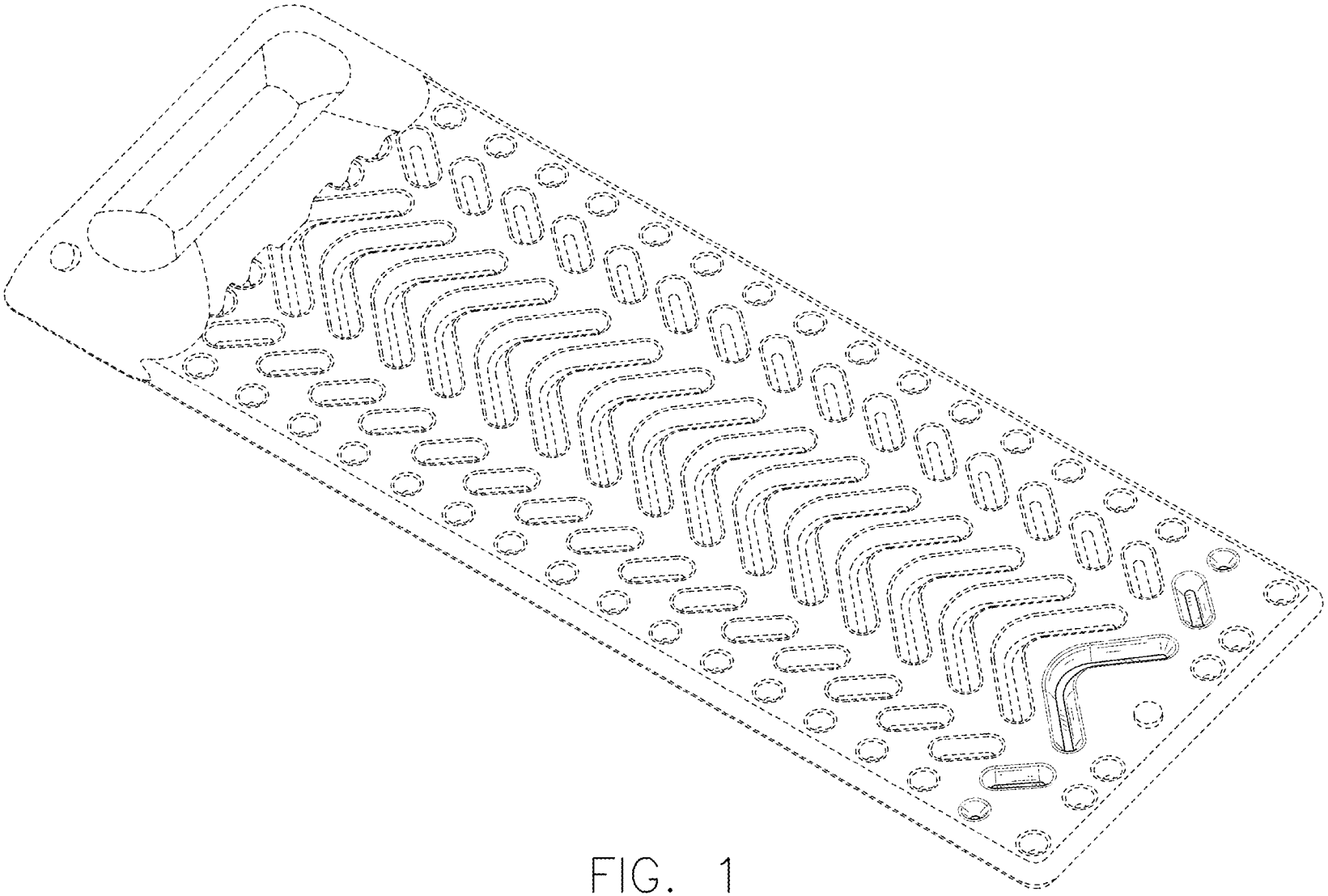
FIG. 1
(AMENDED)

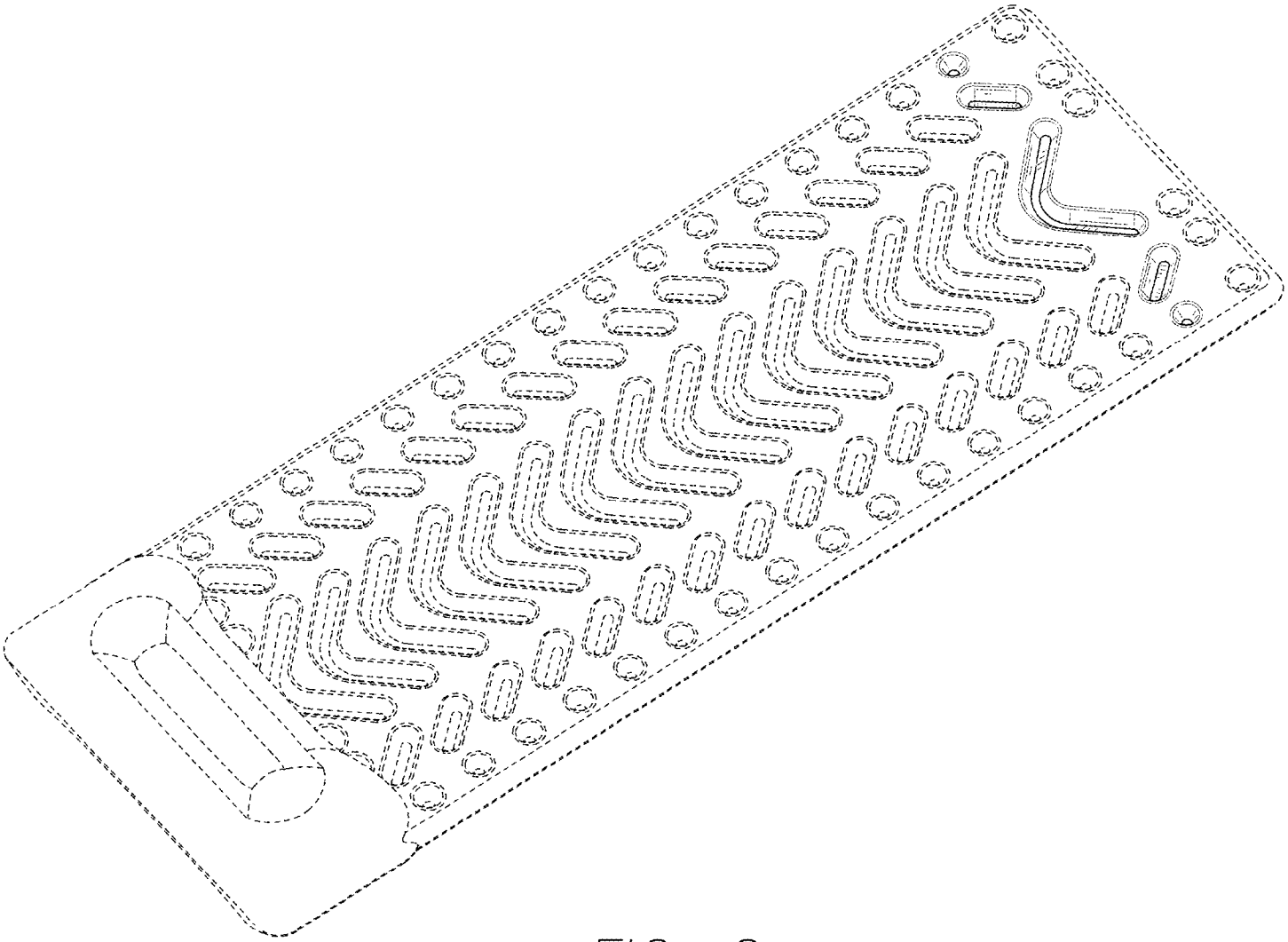
FIG. 2
(AMENDED)

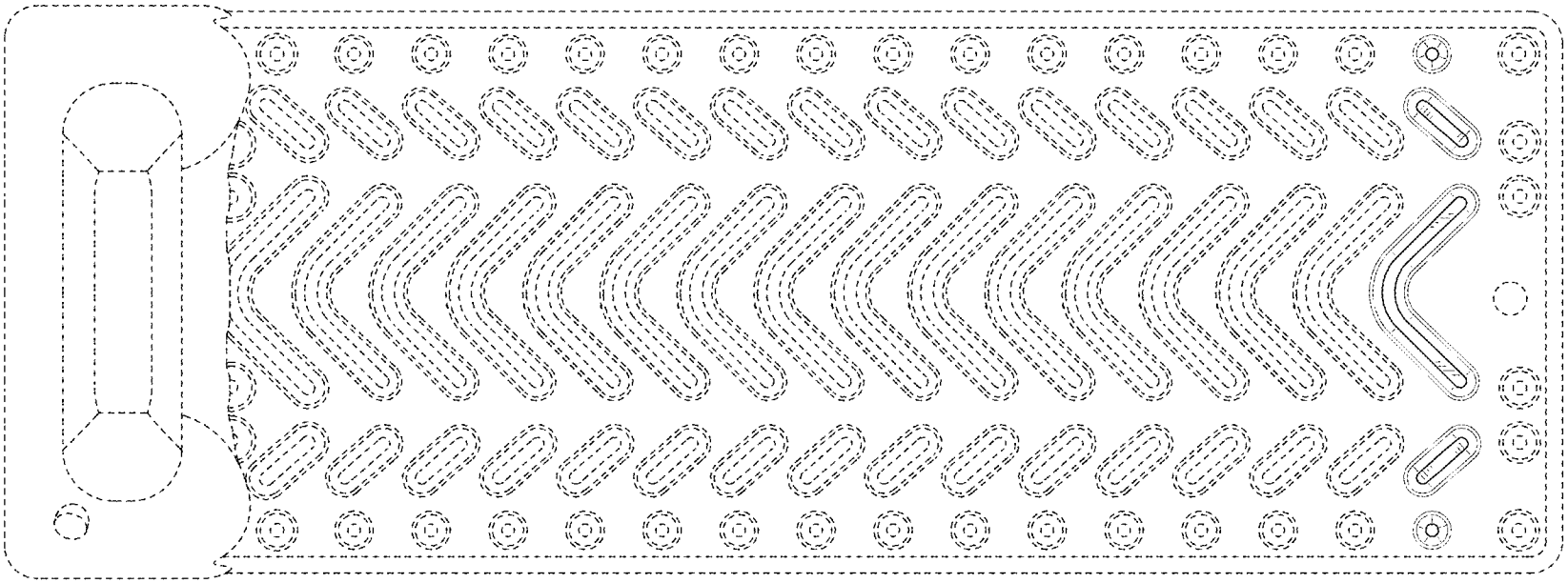
FIG. 3
(AMENDED)

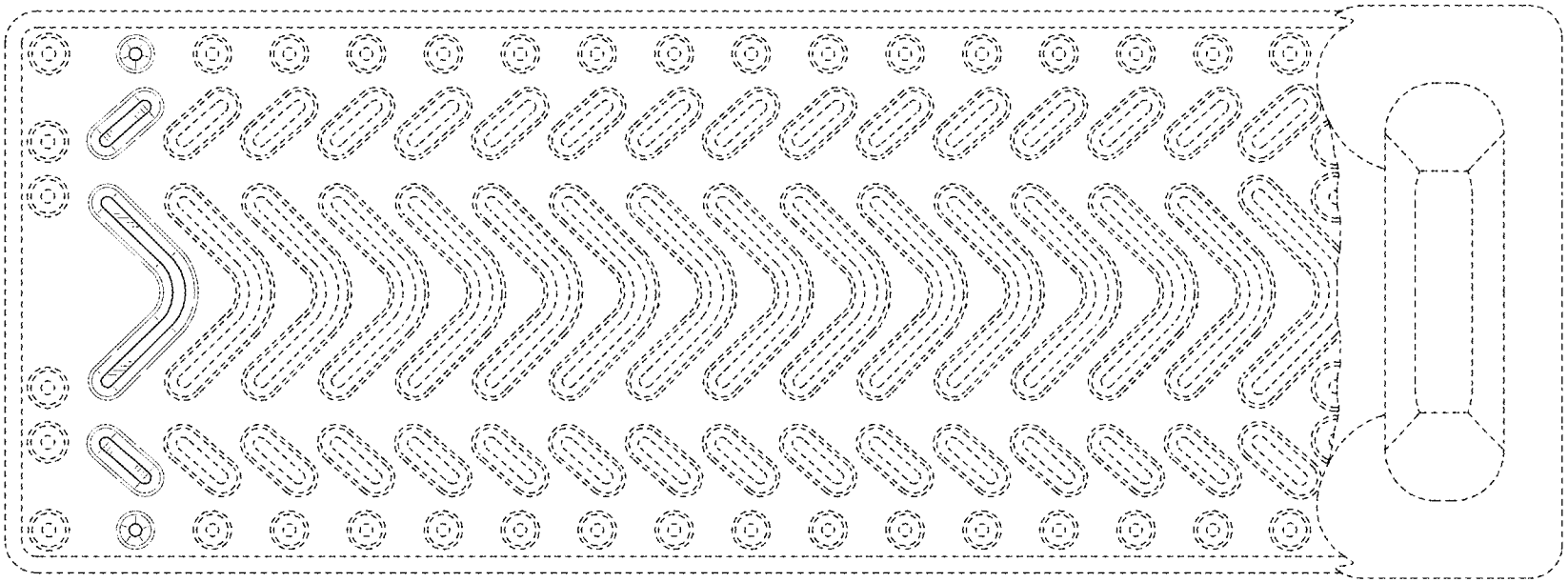
FIG. 4
(AMENDED)

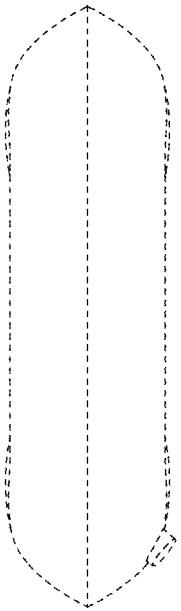
FIG. 5
(AMENDED)

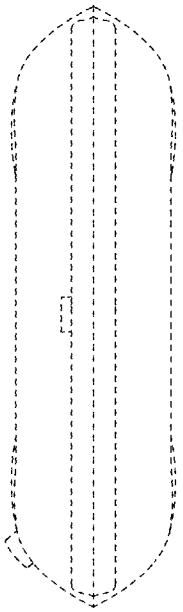
FIG. 6
(AMENDED)

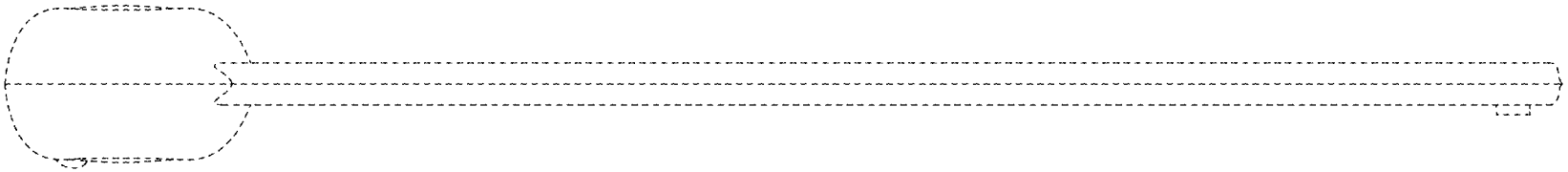
FIG. 7
(AMENDED)

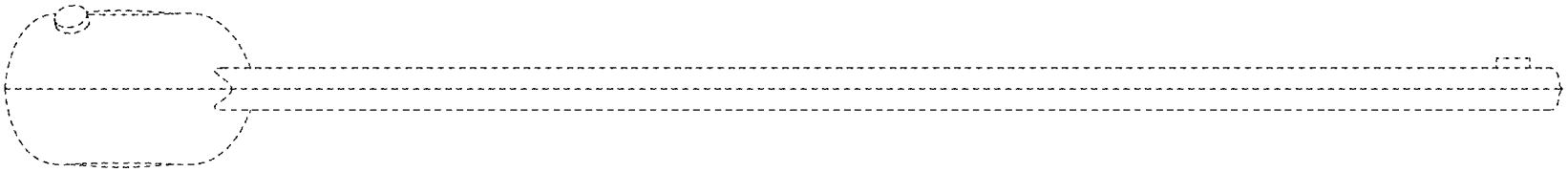
FIG. 8
(AMENDED)